US006825795B1

(12) United States Patent
Segredo

(10) Patent No.: US 6,825,795 B1
(45) Date of Patent: Nov. 30, 2004

(54) TRANSPONDER LOCK

(75) Inventor: Raul Segredo, Miami, FL (US)

(73) Assignee: Avionica, Inc., Miami, FL (US)

( * ) Notice: Subject to any disclaimer, the term of this patent is extended or adjusted under 35 U.S.C. 154(b) by 377 days.

(21) Appl. No.: 10/155,585

(22) Filed: May 24, 2002

Related U.S. Application Data

(60) Provisional application No. 60/332,997, filed on Nov. 16, 2001.

(51) Int. Cl.$^7$ .......................... G01S 13/74; G01S 13/78; G01S 7/00
(52) U.S. Cl. ........................... 342/51; 342/29; 342/30; 342/36; 342/37; 342/42; 342/43; 342/175; 701/1; 701/3; 340/501; 340/505; 340/10.1
(58) Field of Search .......................... 342/29–51, 175, 342/195; 340/384.1, 500, 501, 505–513, 540–542, 945, 963, 964, 971, 531–534, 539.1, 825.36, 7.2, 7.5, 10.1; 701/1, 3, 36, 37, 39, 45, 51

(56) References Cited

U.S. PATENT DOCUMENTS

| | | | | |
|---|---|---|---|---|
| 3,925,763 A | * | 12/1975 | Wadhwani et al. | 340/825.36 |
| 4,015,259 A | * | 3/1977 | Siverhus et al. | 342/44 |
| 4,259,664 A | * | 3/1981 | Boisclair | 340/539.1 |
| 4,706,091 A | * | 11/1987 | Scott | 342/42 |
| 5,159,344 A | * | 10/1992 | Robinson et al. | 342/44 |
| 6,246,320 B1 | * | 6/2001 | Monroe | 340/506 |
| 6,584,383 B2 | * | 6/2003 | Pippenger | 701/36 |

OTHER PUBLICATIONS

Website: http://www.kutv.com/now/story/0,1597,311657–272,00.shtml, *Enlisting the Passenger's Help*, Apr. 3, 2002.
Joseph W. White, *FAA–Industry Transponder Task Force Report*, pp. 1–28, Nov. 5, 2001.
RTCA, Inc, Proposed Final Draft, *Minimum Operational Performance Standards For Air Traffic Control Radar Beacon System/Mode Select (ATCRBS/Mode S) Airborne Equipment*, Feb. 19, 2002, pp. 1–36.

* cited by examiner

*Primary Examiner*—Bernarr E. Gregory
(74) *Attorney, Agent, or Firm*—Sonnenschein, Nath & Rosenthal LLP

(57) ABSTRACT

A transponder lock provides allows an aircraft transponder to continue transmitting an alerting code for the duration of an emergency. The transponder lock thereby enables the aircraft transponder to continue to provide crucial information to ground tracking stations. Installation of the transponder lock results in very little aircraft downtime because the transponder lock connects in-line with existing aircraft wiring.

30 Claims, 8 Drawing Sheets

TRANSPONDER LOCK

CROSS-REFERENCE TO RELATED APPLICATIONS

This application claims the benefit of Provisional Application Ser. Number 60/332,997, titled "Transponder Lock", and filed Nov. 16, 2001, the disclosure of which is expressly incorporated by reference herein.

FIELD OF THE INVENTION

This invention relates to the field of avionics. In particular, this invention relates to a transponder lock that allows an aircraft transponder to continue transmitting an alerting code for the duration of an emergency.

BACKGROUND OF THE INVENTION

An enormous amount of air traffic, carrying thousands upon thousands of human lives, moves across the skies around the world every day. Coordinating the safe takeoff, flight, and landing of each aircraft requires a sophisticated air traffic control network. In the United States, for example, the airspace is divided into 21 zone or centers, and each zone is divided into sectors. Within the zones are 50-mile diameter portions of airspace called TRACON (Terminal Radar Approach CONtrol) airspaces within which lie individual airports with 5-mile radius airspace.

An aircraft provides critical information during flight to help the air traffic control network coordinate air traffic. In particular, once an aircraft takes off, the pilot activates an aircraft transponder. The transponder detects incoming radar signals and, in response, broadcasts an encoded transponder signal in the return direction. The transponder signal typically includes the ATC assigned 4-digit transponder code (aircraft flight number) and altitude. As a result, radar units operated by air traffic controllers are able to display a symbol representing the aircraft, and the radar and air traffic controller may follow the plane throughout its flight.

Without the information provided by the transponder, air traffic control has reduced ability to determine where, how high, or how fast an aircraft is flying. Not only does the lack of transponder information present an unacceptable risk to those on board the aircraft, it also presents an unacceptable risk to passengers on other aircraft nearby, and individuals and property on the ground. In the past, however, aircraft transponders were unduly susceptible to manipulation.

The Sep. 11, 2001 terrorist attacks on the World Trade Center and the Pentagon provide a grim example of the vulnerability of aircraft transponders. According to a CBS News report (retrievable as of Apr. 3, 2002, for example at http://www.kutv.com/now/story/0,1597,311657-412,00.shtml), each transponder on board the four hijacked aircraft was simply shut off. As a result, air traffic control was deprived of vital information concerning where the planes were headed. It is conceivable, had air traffic control known where the planes were heading and how high they were flying, that warnings, evacuations, or other safety steps could have been initiated and directed to suspected target areas.

Another problem is that aircraft idle time caused by grounding the plane to retrofit improved avionics results in an enormous cost to the airline operating the aircraft. Furthermore, the specifications that govern aircraft design are often so strict that retrofitting improved avionics cannot be accomplished without significant investment of time, money, and resources.

A need has long existed for a mechanism that provides continued transponder operation in the event of emergency situations.

SUMMARY OF THE INVENTION

The transponder lock allows an aircraft transponder to continue transmitting, for example, an alerting code or other information or emergency indicia for the duration of an emergency. The transponder lock connects quickly and cleanly in-line with existing aircraft wiring, thereby minimizing aircraft downtime arising from installation of the transponder lock. The absence of installation complexity permits, for example, installing the transponder lock at an airport gate, rather than requiring an airline to incur substantial time and expense penalties arising from flying each aircraft to a remote retrofitting hangar.

Other features, apparatus, methods, and advantages of the present invention will be or will become apparent to one with skill in the art upon examination of the following figures and detailed description. It is intended that all such additional systems, methods, features and advantages be included within this description, be within the scope of the present invention, and be represented by the accompanying drawings.

DETAILED DESCRIPTION

Figure 1:
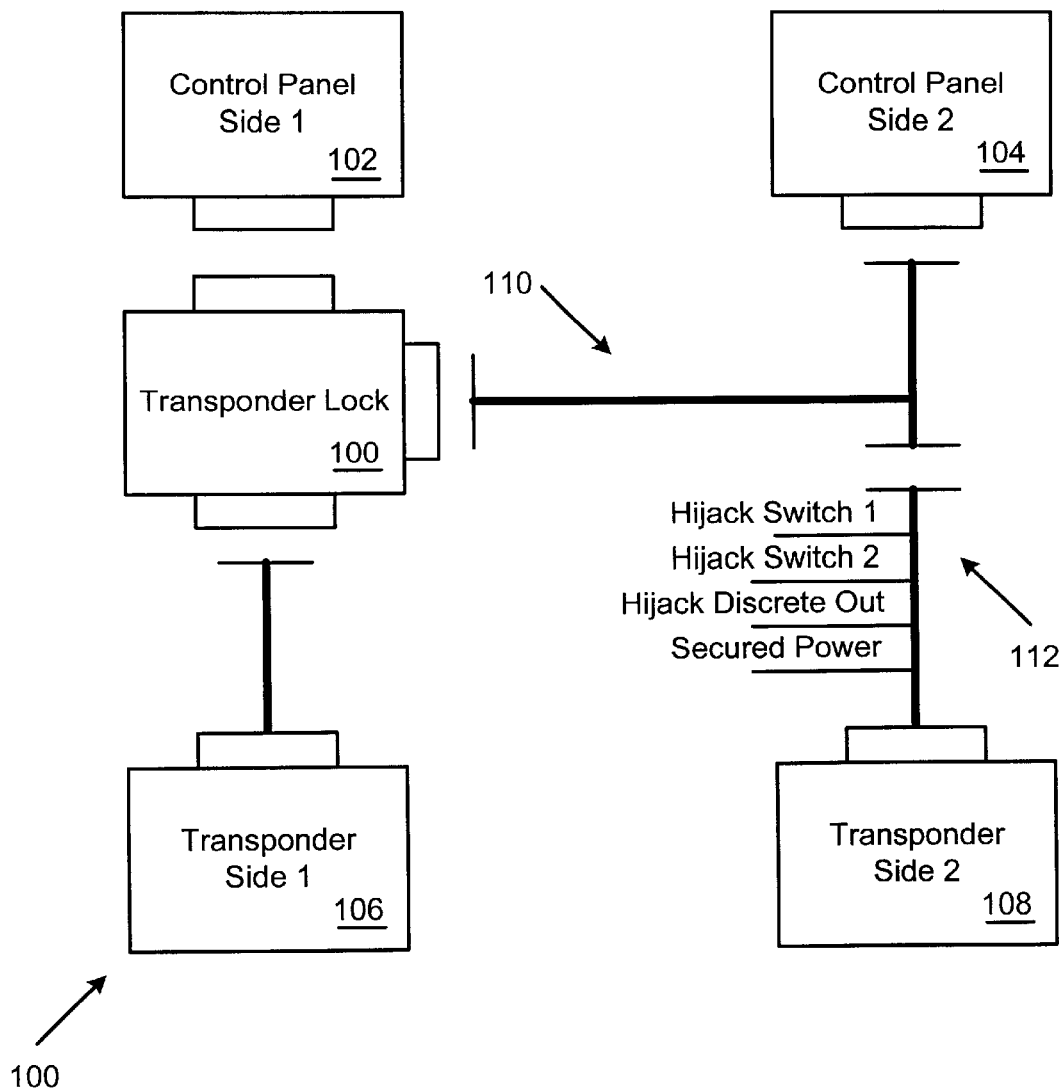
FIG. 1 shows a transponder lock inserted between side-1 and side-2 control panels and side-1 and side-2 transponders.

Turning to FIG. 1, that figure presents a transponder lock 100 in place between a side-1 control panel 102, a side-2 control panel 104, a side-1 transponder 106, and a side-2 transponder 108. As will be explained in more detail below, a connection harness 110 allows the transponder lock 100 to connect in place quickly and without substantial rewiring of the aircraft. In addition, a wiring harness 112 may be optionally included to provided direct hijack switch inputs, auxiliary power, and a hijack mode output, as described in more detail below.

The side-1 control panel 102 supports the control interface for the side-1 transponder 106, while the side-2 control panel 104 supports the control interface for the side-2 transponder 108. The control interfaces are conventional interfaces and typically include a display and the inputs needed to operate a transponder. The inputs include, as examples, an input for channeling a new code for transponder, as well as an operational mode switch that includes a standby and an on setting. Typically, only one transponder is operational at a given time, although the invention may be configured to work with multiple transponders if desired.

Figure 2:
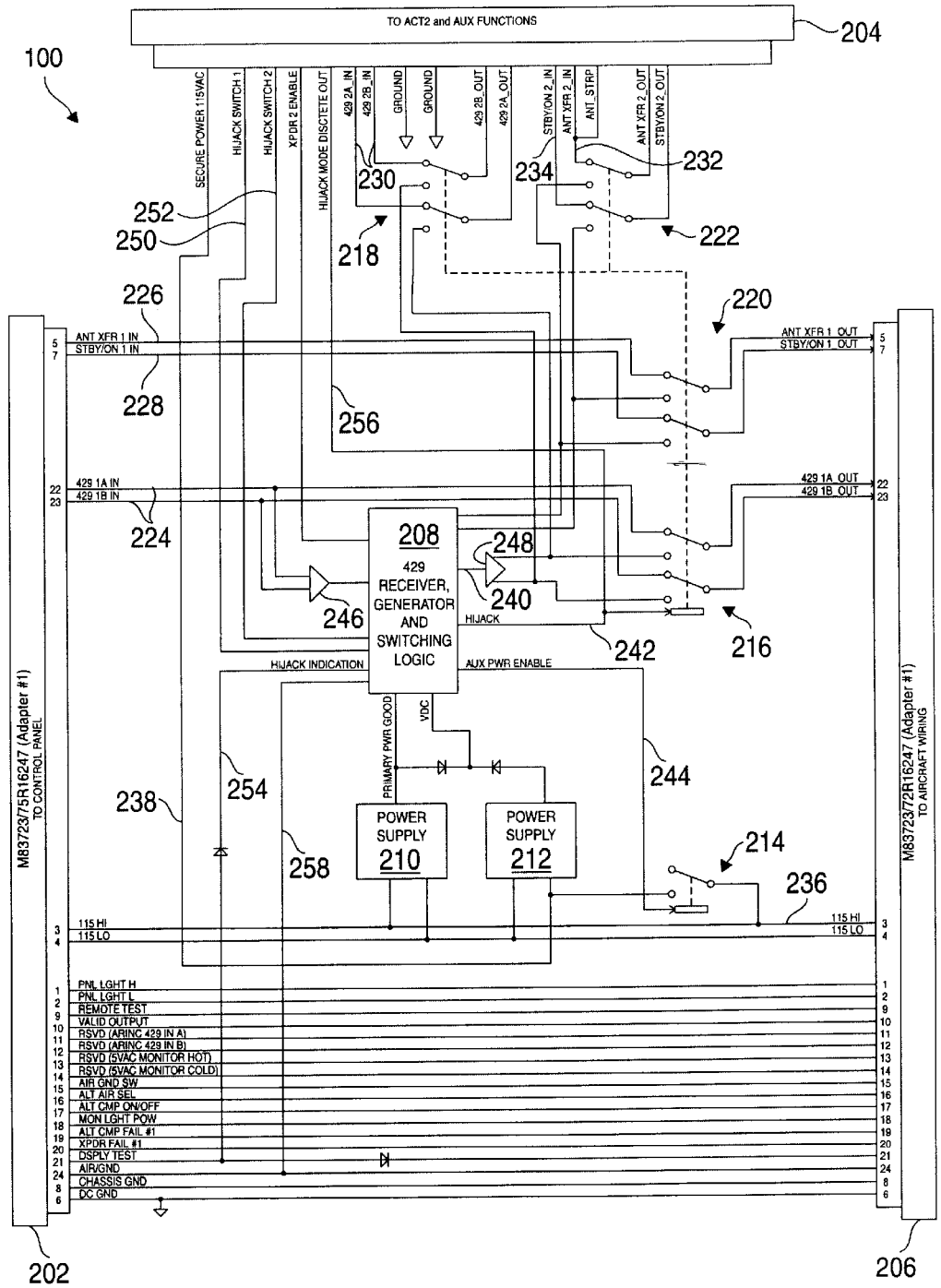
FIG. 2 shows a generalized circuit diagram of the transponder lock.

Turning next to FIG. 2, that figure shows an exemplary implementation of the transponder lock 100. The transponder lock 100 includes a side-1 control panel connector 202 (that leads to the control interface for the side-1 transponder), a wiring harness connector 204 (that leads to a connection harness explained below), and an aircraft wiring connector 206 (which leads to the side-1 transponder itself). The transponder lock 100 also includes control circuitry 208, a primary power supply 210, a secondary power supply 212, and a backup power supply selector 214. A primary power input 236 and a secondary power input 238 are shown in FIG. 2 as well.

The transponder lock 100, as shown, also includes a side-1 transponder selector 216 and a side-2 transponder selector 218. A side-1 auxiliary selector 220 and a side-2 auxiliary selector 222 are also provided.

As shown in FIG. 2, the side-1 control panel connector 202 passes many control panel signals unmodified to the aircraft wiring connector 206. However, the control panel connectors 202 (and 302), through the wiring harness connector 204, also provide certain inputs that the transponder lock 100 passively monitors but manipulates when the transponder lock 100 becomes active. In particular, the side-1 control panel connector 202 supplies a side-1 transponder code input 224, a side-1 antenna transfer input 226, and a side-1 standby input 228. Similarly, the wiring harness connector 204 supplies a side-2 transponder code input 230, a side-2 antenna transfer input 232, and a side-2 standby input 234.

The control circuitry 208 provides a transponder alerting output 240, a transponder override output 242, and a backup power supply enable 244. As will be explained in more detail below with regard to FIG. 5, the control circuitry 208 functionally includes a transponder code detector coupled to one of the transponder code inputs 224, 230 (in this case, the transponder code inputs 224) and the transponder override output 242. The control circuitry 208 further functionally includes a transponder signal generator coupled to the transponder alerting output 240 to generate a transponder code independently of the control panel interfaces to the transponders.

The transponder code inputs 224, 230 are preferably ARINC-429 compatible inputs. The transponder code inputs 224, 230 are thus differential inputs and connect to the control circuitry 208 through the ARINC-429 receiver 246. In the implementation illustrated herein, only the side-1 transponder control input 224 is connected to the control circuitry 208. The side-2 input 230 control code information is assumed to be identical by control panel design. The transponder alerting output 240 connects back into the aircraft wiring through the ARINC-429 transmitter 248.

Figure 3:
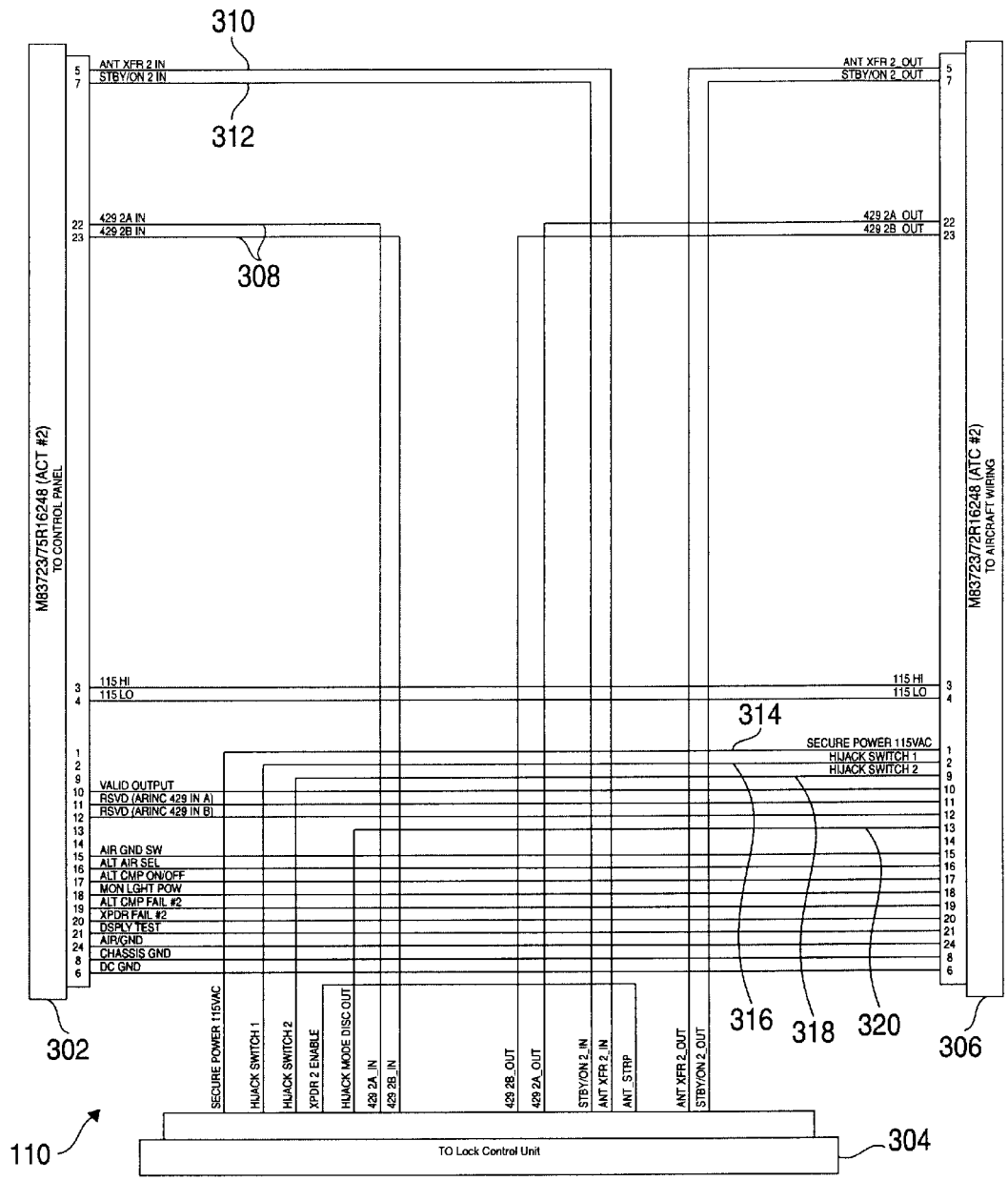
FIG. 3 shows a wiring harness for dual transponder installation.

FIG. 3 shows the connection harness 110 for the side-1 and side-2 transponder installation shown in FIG. 2. The connection harness 110 includes a side-2 control panel connector 302 (which leads to the control interface for the side-2 transponder), a wiring harness connector 304 (which connects to the wiring harness connector 204), and an aircraft wiring connector 306 (which leads to the side-2 transponder itself).

As shown in FIG. 3, many of the connections pass uninterrupted via the control panel connector 302 to the aircraft wiring connector 306. As shown above with regard to FIG. 2, however, the side-2 transponder code input 308, the side-2 antenna transfer input 310, and the side-2 standby input 312 connect first to the transponder lock 100 through the wiring harness connector 304, then back to the side-2 transponder through the aircraft wiring connector 306. Thus, the transponder lock 100 may, under the conditions described above, manipulate the inputs 308–312.

Note also that the wiring harness connector 304 and the aircraft wiring connector 306 provide for auxiliary connections. The auxiliary connections include a secure power input 314, hijack switch inputs 316 and 318, and a hijack indicator output 320.

Figure 4:
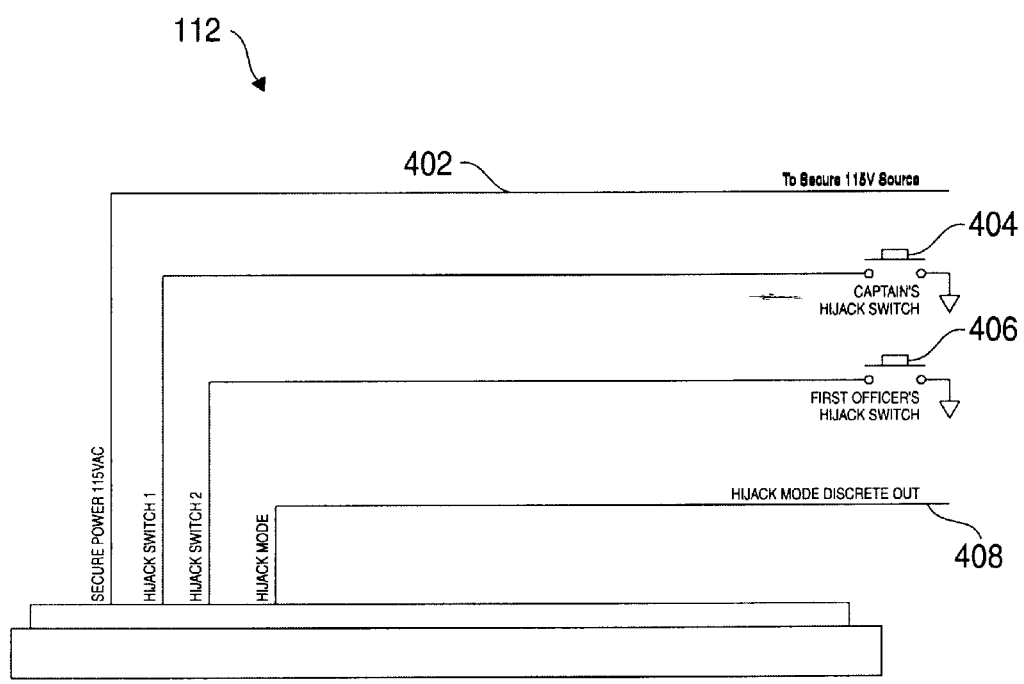
FIG. 4 shows a wiring harness for connecting auxiliary functions to the transponder lock.

FIG. 4 shows a wiring harness 112 for connecting the auxiliary functions to the transponder lock 100 through the aircraft wiring connector 306. The signals shown may also be connected directly to the wring harness connector 204 in installations that have only one transponder. In particular, the wiring harness 112 allocates pins for a secure power connection 402, hijack switches 404 and 406, and for a hijack indicator output 408.

The secure power connection 402 connects to a secondary power input (e.g., a 115 VAC 400 Hz power source) for the transponder lock 100. The hijack switches 404 and 406 provide inputs (e.g., discretely located in the cockpit) that allow personnel to signal an emergency situation without having to channel in a code into the transponder. To that end, the transponder lock 100 monitors the hijack switch inputs 316 and 318 to determine whether one of the hijack switches 404 or 406 has been depressed. If so, the transponder lock 100 immediately enters override mode, rather than waiting to detect a selected transponder lock code.

Referring back to FIG. 1, the transponder lock 100, using the connection harness 110 and the auxiliary wiring harness 112 connects inline between the control panels and the aircraft wiring. No rewiring of the aircraft is required, and the installation can be performed quickly.

Note that the transponder lock 100 may be used in single sided installations as well. In other words, the transponder lock 100 may connect between a single control panel and a single transponder. In a single sided configuration, the selectors 218 and 222 may be eliminated. If the auxiliary inputs (e.g., the hijack switch inputs 250 and 252 and the backup power input 238) are not used (or they are provided using a different connector), the wiring harness connector 204 (and connection harness 110) may be eliminated also.

In the single sided implementation, the transponder lock 100 functions in the same manner as described above. Note, however, that the transponder lock 100 does not need to determine with which of the multiple transponders to communicate. Rather, the transponder lock 100 provides transponder codes for the single transponder, and holds the transponder standby signal for that transponder in an unasserted state.

In one implementation, the side-1 control panel connector 202 is a M83723/75R16247 circular connector with pin assignments shown below in Table 1.

TABLE 1

| Pin # | Function |
| --- | --- |
| 1 | Panel Light High |
| 2 | Panel Light Low |
| 3 | 115 V AC High |
| 4 | 115 V AC Low |

TABLE 1-continued

| Pin # | Function |
|---|---|
| 5 | Antenna Transfer 1 (IN) |
| 6 | DC Ground |
| 7 | Standby/On 1 (IN) |
| 8 | Chassis Ground |
| 9 | Remote Test |
| 10 | Valid Output |
| 11 | (ARINC 429 IN A) side-1 transponder code |
| 12 | (ARINC 429 IN B) side-1 transponder code |
| 13 | (5VAC Monitor Hot) |
| 14 | (5VAC Monitor Cold) |
| 15 | Air/Ground Switch |
| 16 | Altitude Air Select |
| 17 | Altitude Compare ON/OFF |
| 18 | Monitor Light Power |
| 19 | Altitude Compare Fail #1 |
| 20 | Transponder Fail #1 |
| 21 | Display Test |
| 22 | 429 1 A (IN) |
| 23 | 429 1 B (IN) |
| 24 | Air/Ground |

Similarly, the aircraft wiring connector 206 may be a M83723/72R16247 circular connector with a pin assignment shown below in Table 2.

TABLE 2

| Pin # | Function |
|---|---|
| 1 | Panel Light High |
| 2 | Panel Light Low |
| 3 | 115 V AC High |
| 4 | 115 V AC Low |
| 5 | Antenna Transfer 1 (OUT) |
| 6 | DC Ground |
| 7 | Standby/On 1 (OUT) |
| 8 | Chassis Ground |
| 9 | Remote Test |
| 10 | Valid Output |
| 11 | (ARINC 429 IN A) |
| 12 | (ARINC 429 IN B) |
| 13 | (5VAC Monitor Hot) |
| 14 | (5VAC Monitor Cold) |
| 15 | Air/Ground Switch |
| 16 | Altitude Air Select |
| 17 | Altitude Compare ON/OFF |
| 18 | Monitor Light Power |
| 19 | Altitude Compare Fail #1 |
| 20 | Transponder Fail #1 |
| 21 | Display Test |
| 22 | 429 1 A (OUT) |
| 23 | 429 1 B (OUT) |
| 24 | Air/Ground |

In one implementation, the side-2 control panel connector 302 is a M83723/75R16248 circular connector with pin assignments shown below in Table 3.

TABLE 3

| Pin # | Function |
|---|---|
| 1 | Not Connected |
| 2 | Not Connected |
| 3 | 115 V AC High |
| 4 | 115 V AC Low |
| 5 | Antenna Transfer 2 (IN) |
| 6 | DC Ground |
| 7 | Standby/On 2 (IN) |
| 8 | Chassis Ground |
| 9 | Not Connected |
| 10 | Valid Output |

TABLE 3-continued

| Pin # | Function |
|---|---|
| 11 | (ARINC 429 IN A) side-2 transponder code |
| 12 | (ARINC 429 IN B) side-2 transponder code |
| 13 | Not Connected |
| 14 | Not Connected |
| 15 | Air/Ground Switch |
| 16 | Altitude Air Select |
| 17 | Altitude Compare ON/OFF |
| 18 | Monitor Light Power |
| 19 | Altitude Compare Fail #2 |
| 20 | Transponder Fail #2 |
| 21 | Display Test |
| 22 | 429 2 A (IN) |
| 23 | 429 2 B (IN) |
| 24 | Air/Ground |

The aircraft wiring connector 306 may be a M83723/72R16248 circular connector with a pin assignment shown below in Table 4.

TABLE 4

| Pin # | Function |
|---|---|
| 1 | Secured Power 115VAC |
| 2 | Hijack Switch 1 |
| 3 | 115 V AC High |
| 4 | 115 V AC Low |
| 5 | Antenna Transfer 2 (OUT) |
| 6 | DC Ground |
| 7 | Standby/On 2 (OUT) |
| 8 | Chassis Ground |
| 9 | Hijack Switch 2 |
| 10 | Valid Output |
| 11 | (ARINC 429 IN A) |
| 12 | (ARINC 429 IN B) |
| 13 | Hijack Mode Discrete (OUT) |
| 14 | Not Connected |
| 15 | Air/Ground Switch |
| 16 | Altitude Air Select |
| 17 | Altitude Compare ON/OFF |
| 18 | Monitor Light Power |
| 19 | Altitude Compare Fail #2 |
| 20 | Transponder Fail #2 |
| 21 | Display Test |
| 22 | 429 2 A (OUT) |
| 23 | 429 2 B (OUT) |
| 24 | Air/Ground |

The wiring harness connector 204 may, for example, have a pin assignment shown below in Table 5.

TABLE 5

| Pin # | Function | Notes |
|---|---|---|
| 1 | DC Ground | |
| 2 | Chassis Ground | |
| 3 | Secured Power 115VAC | |
| 4 | 115 V AC Low | |
| 5 | Antenna Transfer 2 (IN) | |
| 6 | Antenna Transfer 2 (OUT) | |
| 7 | Standby/On 2 (IN) | |
| 8 | Standby/On 2 (OUT) | |
| 9 | Antenna strap | |
| 10 | Transponder 2 Enable | |
| 11 | 429 2 A (IN) | |
| 12 | 429 2 B (IN) | |
| 13 | 429 2 A (OUT) | |
| 14 | 429 2 B (OUT) | |
| 16 | Hijack Switch 1 | Captain's switch |
| | Hijack Switch 2 | First Officer's switch |

TABLE 5-continued

| Pin # | Function | Notes |
| --- | --- | --- |
| 18 | Hijack Mode Discrete (OUT) | |

Figure 5:
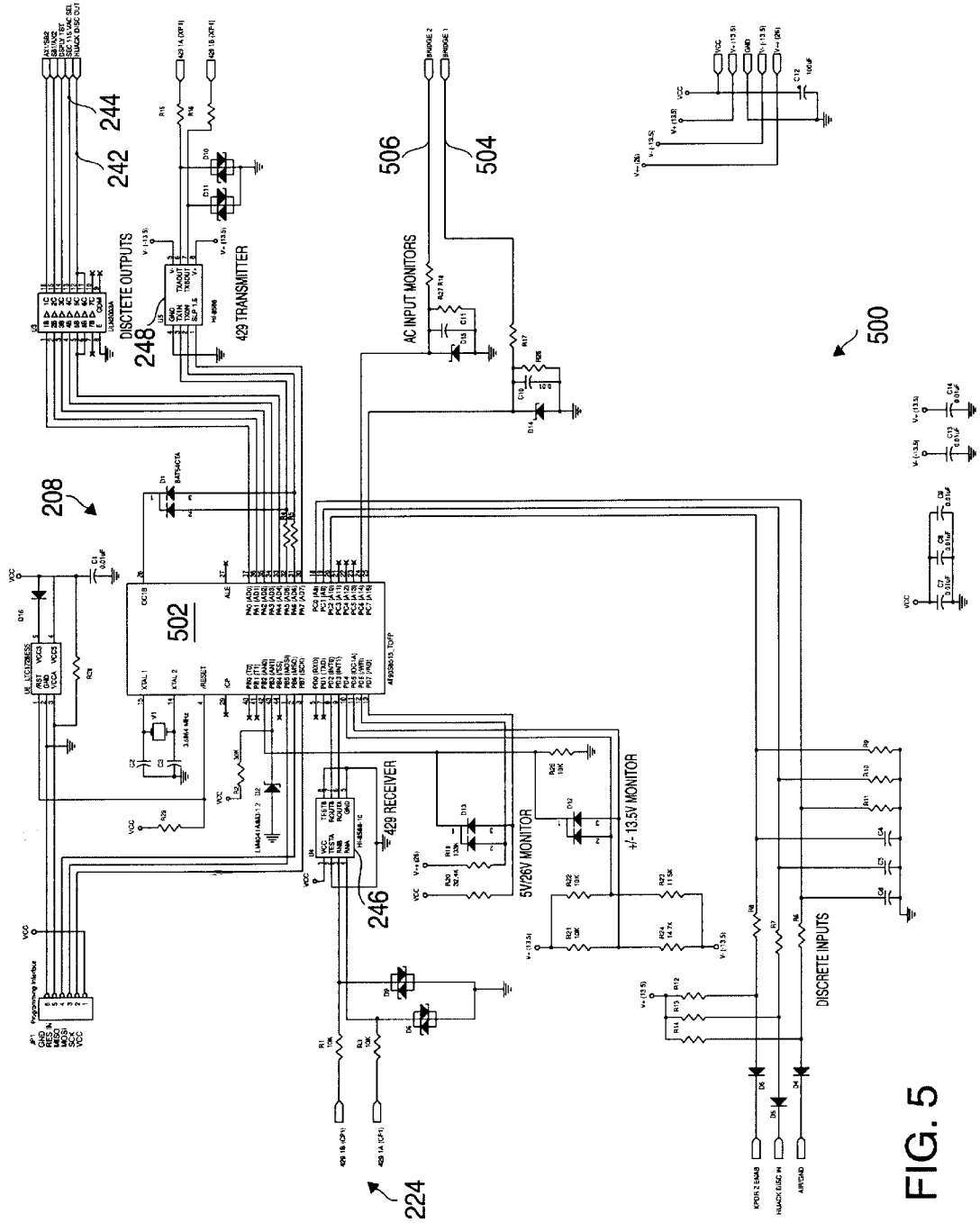
FIG. 5 shows detailed circuitry for implementing the control, detection, and signaling functionality of the transponder lock.

Turning next to FIG. 5, that figure illustrates a detailed circuitry 500 for implementing the control, detection, and signaling functionality of the transponder lock 100 present in the control circuitry 208. The control circuitry 208 includes a microcontroller 502 (in this implementation, an Amtel AT90S8515) executing instructions out of an on-board Flash and EEPROM memory. The microcontroller 502 and the instructions in memory implement transponder code detector functionality and transponder signal generator functionality described above.

Although the operation of the transponder lock 100 will be described below with reference to the microcontroller implementation shown in FIG. 5, it is noted that in other implementations, the control circuitry 208 may be replaced by discrete logic, multiple microcontrollers, and the like. Thus, for example, while the microcontroller 502 implements both the transponder code detector functions and the transponder signal generator functions, those functions may be replaced by individual discrete logic circuits or by individual microcontroller circuits.

As shown in FIG. 5, the receiver 246 and transmitter 248 are implemented using a HI-8588 and a HI-8586, respectively, available from Holt Integrated Circuits Inc. The microcontroller 502 monitors the operational voltages used in the transponder lock 100 for over-voltage conditions. To that end, as shown in FIG. 5, the 5V (VCC), 26V, 13.5V and -13.5V supplies are routed through conditioning circuitry to the microcontroller 502 for monitoring purposes.

The primary power supply 210 provides DC power for the control circuitry from the AC power supplied on the primary power input 236. Typically, the primary power input 236 supplies a 115 VAC 400 Hz signal that the primary power supply 210 converts to the DC voltage appropriate for running the control circuitry 208 (e.g., 5 Volts).

The control circuitry 208 monitors the voltage provided by the primary power supply 210 and the secondary power supply 212 by reading a digital value on the primary power supply monitor input 504 and the secondary power supply monitor input 506. In other implementations, a microcontroller may use an internal A/D converter to provide a direct representation of the voltage, and periodically compare the voltage to a minimum reference point. If the primary power supply voltage falls below the minimum reference point, or if the digital value reads zero instead of one, then the microcontroller may assert the backup power supply enable 244 to connect the secondary power input 238 to the rest of the aircraft as a backup power supply. To that end, the backup power supply selector 214 may be implemented using a relay (or, alternatively, solid state switches) activated by the backup power supply enable 244. Thus, a loss of primary power, whether deliberate or accidental, will not disable the transponder lock 100 when a secondary power source is connected to the secondary power input 238.

A portion of the instructions in the memory instruct the microcontroller 502 to act as a transponder code detector. To that end, the microcontroller 502 monitors the digital communications present on the side-1 transponder code input 224 by periodically reading the contents of the data present on the transponder code input 224. In the absence of a preselected transponder lock code, the transponder lock 100 leaves the transponder override output 242 unasserted. As a result, normal transponder operation occurs, and transponder signals from the control panel pass to the side-1 and side-2 transponders (although, as noted above, only one of the transponders is active at a given time).

However, when the control circuitry 208 detects the transponder lock code (e.g., code 7500 input at the control panel), then the transponder lock 100 switches into an override mode. The override mode is thus generally responsive to the presence of an emergency condition (e.g., a hijacking). In override mode, the transponder lock 100 asserts the transponder override output 242.

The selectors 216, 218, 220, and 222 may be implemented using one or more relays (or, alternatively, solid state switches) activated by the transponder override output 242. As shown in FIG. 2, when the transponder override output 242 is active, the transponder lock 100 delivers the transponder alerting output 240 to either the side-1 transponder or side-2 transponder. In particular, the transponder lock 100 communicates with one transponder while placing the other in standby mode. The microcontroller 502 may place a transponder in standby mode by connecting the side-1 standby input 228 or side-2 standby input 234 to a standby level (e.g., grounded as opposed to left open) through the selectors 220 or 222, while the remaining standby input is held at an active level (e.g., left open). The choice of side-1 or side-2 transponder may be made, for example, depending on a discrete input signal (e.g., the side-2 antenna transfer input 232), or may be made by default to the side-1 or side-2 transponder in every case.

At the same time, the instructions in the memory instruct the microcontroller 502 to operate as a transponder signal generator. When operating as a transponder signal generator, the control circuitry 208 outputs a preselected transponder alerting signal. The transponder alerting signal is output through the ARINC-429 transmitter 248 and comprises a selected transponder code (e.g., code 7500), or any other preselected code to indicate an emergency situation. Thus, in override mode, the transponder lock 100 provides the code to the transponder.

As a result, subsequent tampering or manipulation of the transponder control panel after the transponder lock code is detected will have no effect on the operation of the transponders. Rather, one of the transponders will continue to transmit the selected transponder alerting signal (e.g., code 7500) provided by the transponder lock 100.

In some implementations, one or more emergency switches may be connected to the emergency switch inputs 250 and 252. Thus, in addition to monitoring for the transponder lock code, the control circuitry 208 may monitor for activation of the emergency switches. When the control circuitry 208 detects that one or more of the emergency switches has been depressed (e.g., by the detecting the presence of an emergency switch signal asserted on an emergence switch input), the control circuitry 208 immediately switches into override mode.

Note further that the transponder lock 100 may indicate switching into override mode by giving feedback to the personnel in the cockpit. As one example, the control circuitry 208 may assert the lock indicator output 254 for a predetermined amount of time (e.g., 3 seconds). Asserting the lock indicator output 254 (which couples to the transponder control display test signal) activates all the display elements on the transponder control panel to provide visual feedback that the transponder lock 100 has entered override mode. In addition, as shown in FIG. 2, the transponder override output 242 may be routed to a discrete emergency output 256 for connection to any additional downstream circuitry desired.

Note that the microcontroller 502 may also perform self test diagnostics. If a failure is detected, the microcontroller 502 may then assert the lock indicator output 254 for a longer period of time (e.g., 30 seconds) to indicate the failure.

The control circuitry 208 remains in override mode until a preselected transponder unlock code (e.g., code 3785) is input. In other words, the control circuitry 208, even in override mode, continues to monitor the transponder code input 224 searching for the transponder unlock code. Optionally, the control circuitry 208 may further require that the air/ground input 258 indicate that the aircraft is on the ground before leaving override mode.

Once out of override mode, the transponder lock 100 deasserts the transponder override output 242. Normal transponder operation under control of the control panels then resumes.

Figure 6:
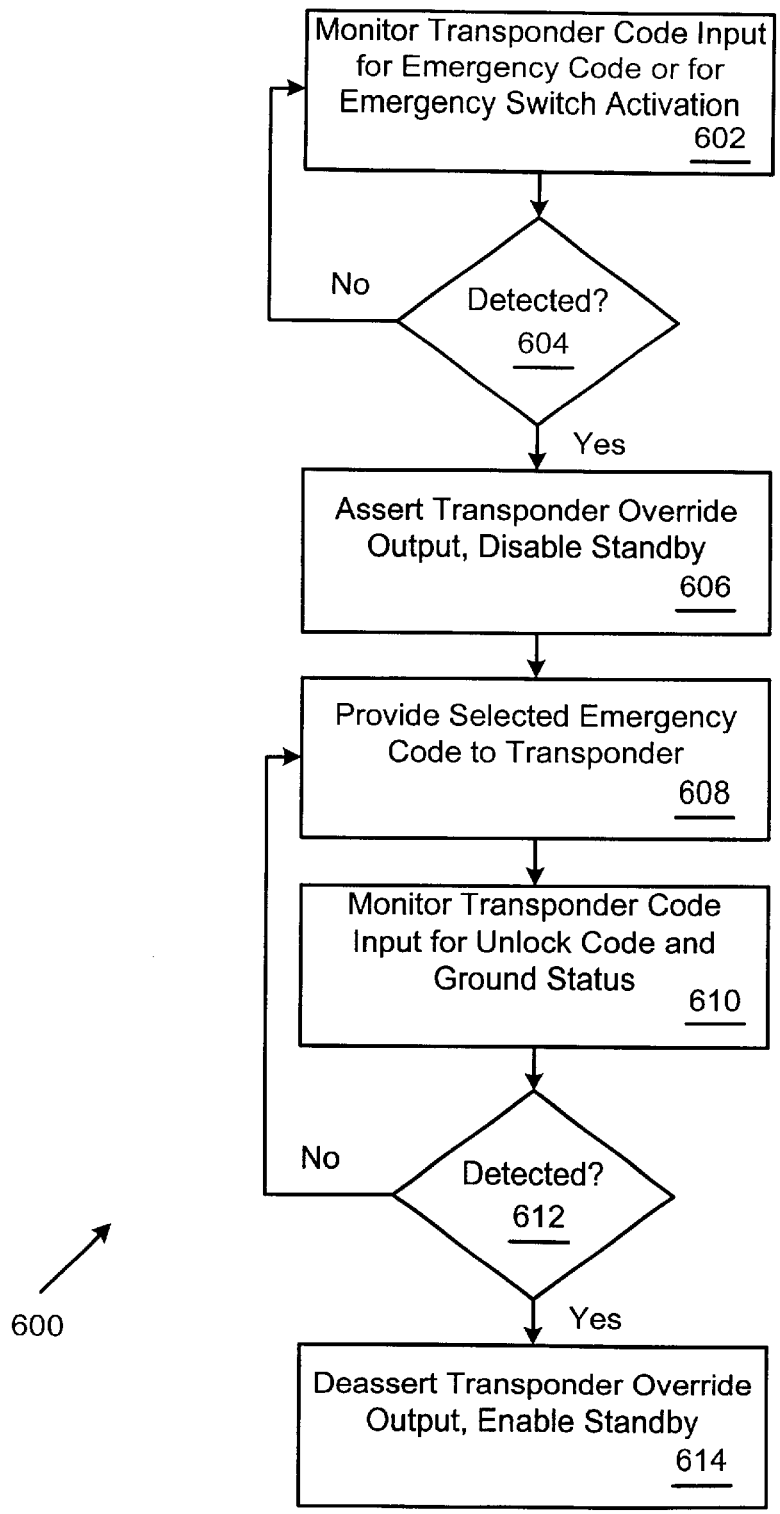
FIG. 6 shows a flow diagram for the operation of the control circuitry.

With respect next to FIG. 6, that figure shows a flow diagram 600 of the operation of the control circuitry 208. The control circuitry is initially passive, but monitors the transponder code input 224 for an emergency code, and monitors the emergency switch inputs 250 and 252 for activation of a hijack switch 404, 406 (steps 602, 604). If detected, the control circuitry 208 asserts the transponder override output 242 and disables the standby for the transponder (step 606). In other words, the control circuitry 208 enters override mode.

The transponder lock 100 subsequently provides a selected emergency transponder code to the transponder (step 608). In the meantime, the transponder lock 100 monitors the transponder code input 224 for a predetermined unlock code, and optionally checks to see that ground status is indicated for the aircraft (steps 608, 610). If the unlock code is detected, then control circuitry 208 deasserts the transponder override output 242, and enables the standby for the transponder (step 614). In other words, the transponder lock 100 leaves override mode.

Figure 7:
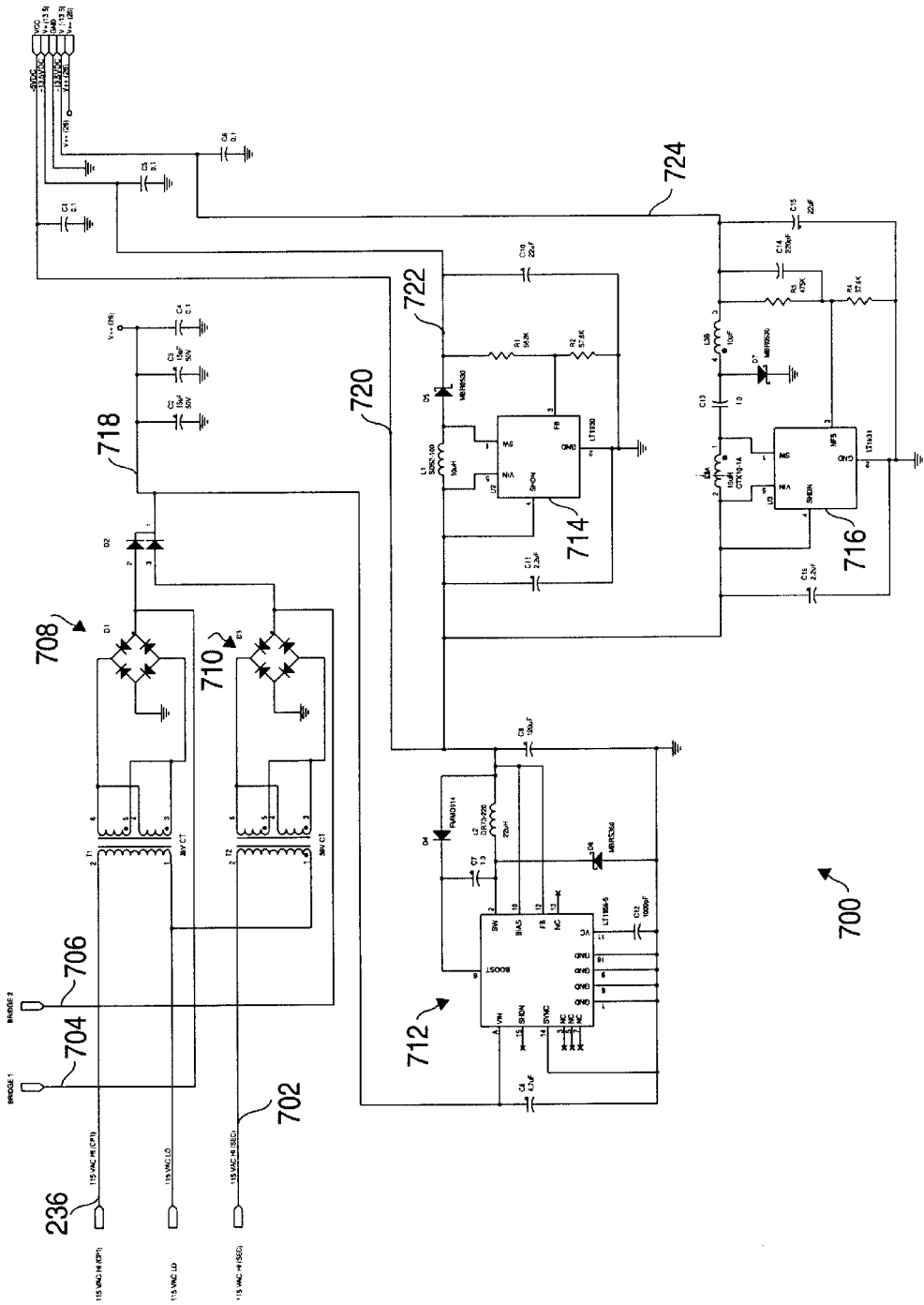
FIG. 7 shows a detailed circuit diagram for the power supply section of the transponder lock.

FIG. 7 shows a detailed circuit diagram for one implementation of the power supply section 700 of the transponder lock. The power supply section 700 includes a primary power input 236, a secondary power input 702, a primary power monitor output 704, and a secondary power monitor output 706. A primary bridge 708 and a secondary bridge 710 independently provide full wave rectification of input AC voltages. The rectified output 718 carries an approximately 26 volt DC signal.

FIG. 7 also shows a first DC to DC converter 712, a second DC to DC converter 714, and a third DC to DC converter 716. The first DC to DC converter 712 (e.g., an LT 1956-5 available from Linear Technology) accepts the voltage from the rectified output 718 and produces a 5 Volt VCC output 720 that powers the digital circuitry of the transponder lock 100. The VCC output 720 is also supplied to the second DC to DC converter 714 (e.g., an LT 1930) to generate a 13.5 Volt DC auxiliary output 722. In addition, the VCC output 720 is supplied to the third DC to DC converter 716 (e.g., an LT 1931) to generate a negative 13.5 volt DC auxiliary output 724.

Figure 8:
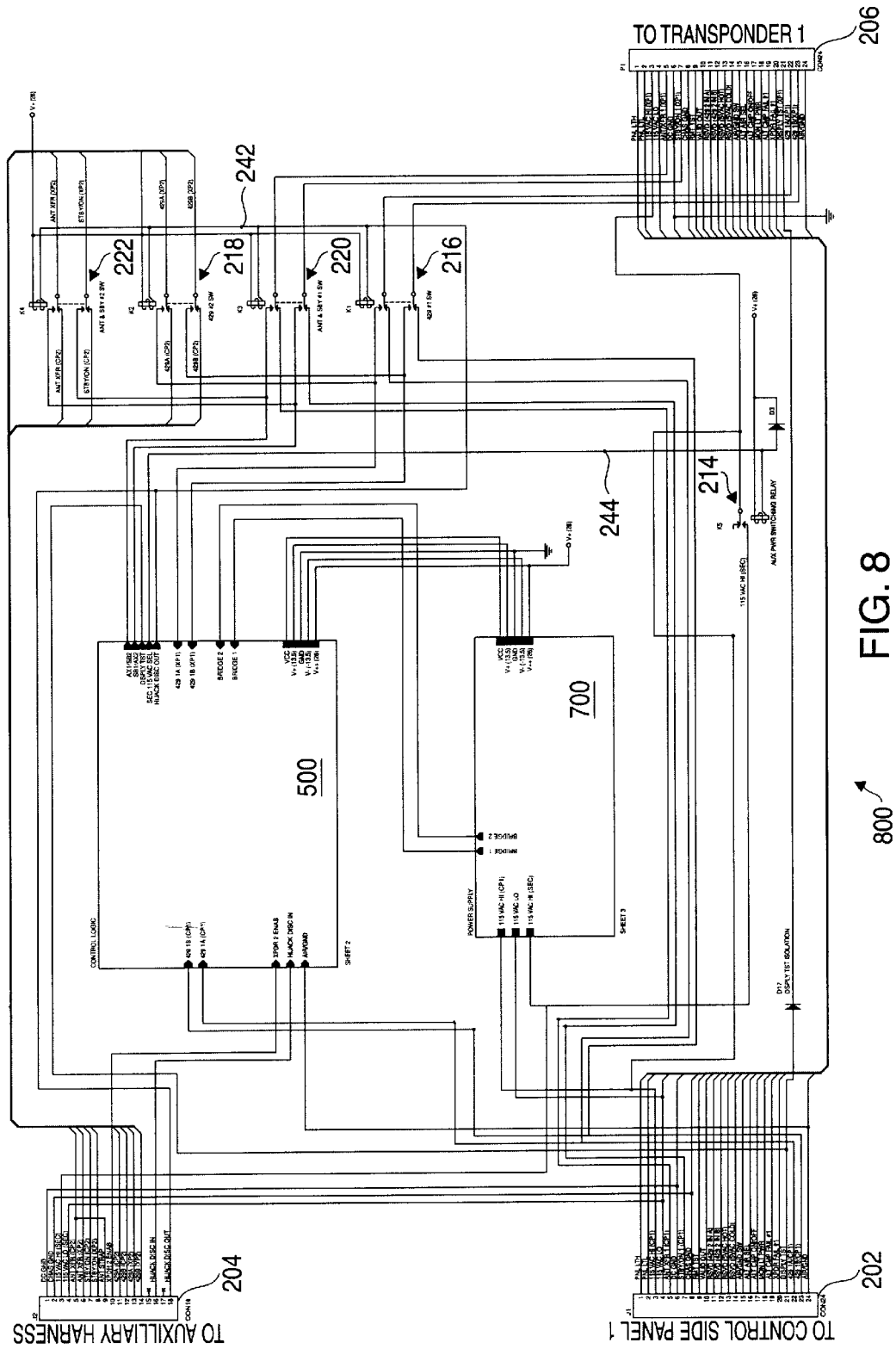
FIG. 8 shows a detailed connection diagram for placing the transponder lock in-circuit with the control panels and transponders.

FIG. 8 shows a detailed connection diagram 800 for placing the transponder lock 100 in-circuit with the control panels and transponders. In particular, the connection diagram 800 shows the interconnection between the control and signaling section 500 of the transponder lock 100 and the power supply section 700. The connection diagram 800 also shows the interconnection between the side-1 control panel connector 202, wiring harness connector 204, and aircraft wiring connector 206 with the signaling section 500 and the power supply section 700.

The connection diagram 800 further illustrates the connections for the side-1 transponder selector 216, side-2 transponder selector 218, side-1 auxiliary selector 220, and side-2 auxiliary selector 222. The selectors 216–222 accept the 26 Volt DC output and are collectively controlled by the transponder override output 242. As shown in FIG. 8, the backup power supply selector 214 is separately controlled by the backup power supply enable 244.

Generally, the means for generating a transponder signal and the means for detecting the transponder lock code may be regarded as the transponder lock 100 as a whole, the control circuitry 208, the microcontroller 502, or the microcontroller 502 in concert with the program instructions executed by the microcontroller 502. Similarly, the means for coupling the transponder alerting output to the transponder code output may be regarded as the transponder lock 100 as a whole, the control circuitry 208 (or microcontroller 502) in concert with the switch 216 or the switch 218 itself.

Thus, the transponder lock allows a transponder to continue transmitting an alerting code for the duration of an emergency. The transponder lock connects in-line with existing aircraft wiring, thereby minimizing aircraft downtime arising from installation of the transponder lock. In particular, the control panel connectors 202, 302 and the aircraft wiring connectors 206, 306 are chosen to mate with connectors already present for existing aircraft wiring. The reduction in installation complexity permits, for example, installation of the transponder lock at the airport gate, rather than requiring an airline to incur substantial time and expense penalties from flying each aircraft to a remote retrofitting hangar.

Note also that the transponder lock is fail-safe in that if the transponder lock circuitry should fail, the aircraft transponder system remains functional. In other words, if the transponder lock fails to function, the relays that switch the transponder over to transponder alerting output generated by the transponder lock are not energized. As a result, the aircraft transponder continues to receive code information from the cockpit control. Thus, even in the unlikely event that the transponder lock fails, it does not deprive the aircraft of transponder functionality.

The foregoing description of an implementation of the invention has been presented for purposes of illustration and description. It is not exhaustive and does not limit the invention to the precise form disclosed. Modifications and variations are possible in light of the above explanation or may be acquired from practicing of the invention. The claims and their equivalents define the scope of the invention.

What is claimed is:

1. A transponder lock comprising:
   a transponder code input;
   a transponder code output;
   control circuitry coupled to the transponder code input and comprising a transponder alerting output and a transponder override output; and
   a transponder selector coupled to the transponder override output for coupling one of the transponder code input and the transponder alerting output to the transponder code output.

2. A transponder lock according to claim 1, further comprising a control panel connector coupled to the transponder code input and an aircraft wiring connector coupled to the transponder code output, the control panel connector and the aircraft wiring connector adapted to mate with preexisting aircraft wiring.

3. A transponder lock according to claim 1, wherein the control circuitry asserts the transponder override output in response to a preselected transponder lock code on the transponder code input.

4. A transponder lock according to claim 1, wherein the control circuitry asserts the transponder override output until a preselected unlock code is present on the transponder code input.

5. A transponder lock according to claim 1, further comprising an air/ground input coupled to the control circuitry, and wherein the control circuitry asserts the transponder override output until a preselected unlock code is present on the transponder code input and until the air/ground input indicates ground status.

6. A transponder lock according to claim 1, further comprising a backup power supply coupled to the control circuitry.

7. A transponder lock according to claim 6, further comprising a power supply selector coupled to a backup power supply enable output.

8. A transponder lock according to claim 1, further comprising a panic switch input coupled to the control circuitry.

9. A transponder lock according to claim 8, wherein the control circuitry asserts the transponder override output in response to a preselected transponder lock code on the transponder code input as well as in response to a panic signal asserted on the panic switch input.

10. A transponder lock according to claim 1, wherein the control circuitry further comprises a lock indicator output.

11. A transponder lock according to claim 10, where the lock indicator output couples to a display test control panel connection.

12. A transponder lock according to claim 1, wherein the transponder selector comprises a relay.

13. A transponder lock according to claim 11, wherein the relay, when the transponder override output is unasserted, couples the transponder code input to the transponder code output.

14. A transponder lock comprising:
a transponder code input;
a side-1 transponder code output;
a side-2 transponder code output;
control circuitry coupled to the transponder code input and comprising a transponder alerting output and a transponder override output;
a side-1 transponder selector coupled to the transponder override output for coupling one of the transponder code input and the transponder alerting output to the transponder side-1 code output; and
a side-2 transponder selector coupled to the transponder override output for coupling the transponder alerting output to the transponder side-2 code output.

15. A transponder lock according to claim 14, further comprising a control panel connector coupled to the transponder code input and an aircraft wiring connector coupled to at least one of the side-1 and side-2 transponder code output, the control panel connector and the aircraft wiring connector adapted to mate with preexisting aircraft wiring.

16. A transponder lock according to claim 14, further comprising a backup power supply coupled to the control circuitry, and a power supply selector coupled to a backup power supply enable output.

17. A transponder lock according to claim 14, further comprising a panic switch input coupled to the control circuitry.

18. A transponder lock according to claim 14, wherein the control circuitry further comprises a lock indicator output.

19. A transponder lock according to claim 18, where the lock indicator output couples to a display test control panel connection.

20. A transponder lock according to claim 14, further comprising a connection harness coupled to the control circuitry and comprising a side-2 control panel connector.

21. A transponder lock comprising:
a transponder code input;
a transponder code output;
means for generating a transponder signal on the transponder code output;
means for detecting a preselected transponder lock code and asserting a transponder override output;
means coupled to the transponder override output for coupling at least one of the transponder code input and the transponder alerting output to the transponder code output until the means for detecting detects a transponder unlock code.

22. A method for providing an alerting signal for an aircraft transponder on a transponder code output, the method comprising the steps of:
monitoring a transponder code input for a preselected transponder lock code; and
in response to the preselected transponder lock code,
disconnecting the transponder code input from the transponder code output;
coupling a transponder alerting output to the transponder code output; and
presenting an altering signal on the transponder alerting output.

23. The method of claim 22, further comprising the steps of:
monitoring the transponder code input for a preselected unlock code; and
in response to the preselected unlock code,
disconnecting the transponder alerting output from the transponder code output; and
coupling the transponder code input to the transponder code output.

24. The method of claim 23, wherein the step of monitoring comprises the step of monitoring the transponder code input for the preselected unlock code and monitoring an air/ground input for ground status.

25. The method of claim 22, further comprising the step of monitoring a primary power supply to switch to a backup power supply when the primary power supply voltage falls below a preselected threshold.

26. A method for providing an alerting signal for an aircraft transponder on a transponder code output, the method comprising the steps of:
determining a lock condition by monitoring an emergency switch input for activation; and
in response to the lock condition,
disconnecting the transponder code input from the transponder code output;
coupling a transponder alerting output to the transponder code output; and
presenting an altering signal on the transponder alerting output.

27. The method of claim 26, wherein the step of determining comprises determining the lock condition by monitoring at least one of the emergency switch input for activation and a transponder code input for a preselected transponder lock code.

28. A transponder lock comprising:
a transponder code input;
a transponder code output;
an emergency switch input;
control circuitry coupled to the emergency switch input and comprising a transponder alerting output and a transponder override output; and
a transponder selector coupled to the transponder override output for coupling one of the transponder code input and the transponder alerting output to the transponder code output in response to an emergency switch signal on the emergency switch input.

29. A transponder lock according to claim 28, further comprising a control panel connector coupled to the transponder code input and an aircraft wiring connector coupled to the transponder code output, the control panel connector and the aircraft wiring connector adapted to mate with preexisting aircraft wiring.

30. A transponder lock according to claim 27, further comprising an air/ground input coupled to the control circuitry, and wherein the control circuitry asserts the transponder override output until a preselected unlock code is present on the transponder code input and until the air/ground input indicates ground status.

* * * * *